April 13, 1937.　　　　F. A. HAYES　　　　2,076,560
VARIABLE SPEED POWER TRANSMISSION SYSTEM
Filed Aug. 11, 1934
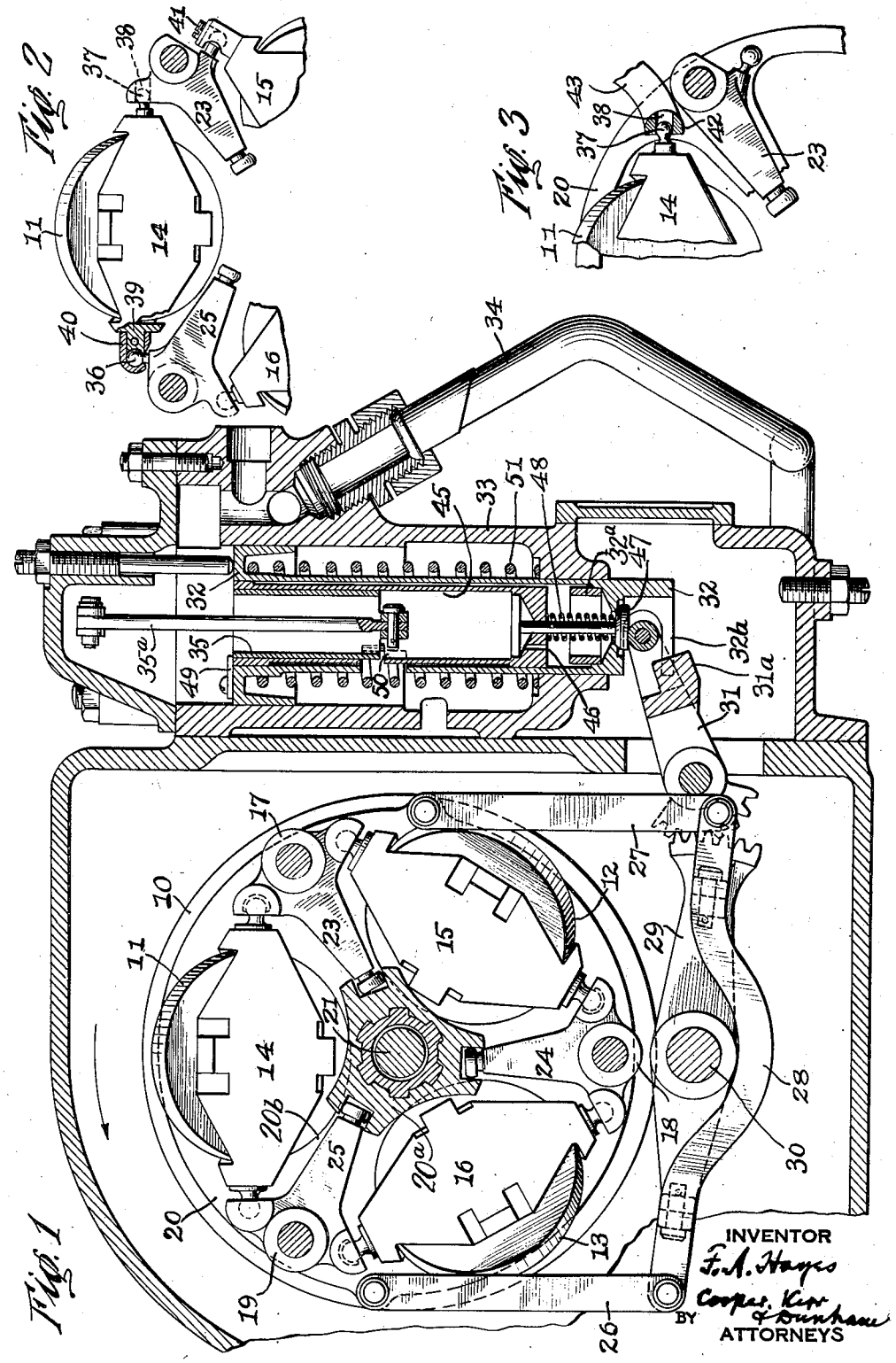
INVENTOR
F. A. Hayes
BY Cooper, Kerr & Dunham
ATTORNEYS Patented Apr. 13, 1937

2,076,560

UNITED STATES PATENT OFFICE 2,076,560

VARIABLE SPEED POWER TRANSMISSION SYSTEM

Frank Anderson Hayes, Middletown, N. J.

Application August 11, 1934, Serial No. 739,435
In Great Britain August 23, 1933

5 Claims. (Cl. 74—200)

This invention relates to variable speed power transmission systems and has particular reference to systems of the coaxial torus disc type with intervening rollers mounted in carriers supported by rockers as in my prior Patent No. 1,865,102. The chief object of the present invention is to provide improved means for overcoming the "freewheeling" effect sometimes observed, due to clearance between the ball ends of the roller carriers and the rocker sockets in which the balls work, together with general back-lash and deflection in the control system, which free-wheeling effect takes place on a reversal of load on the control such as occurs when coasting or using the engine as a brake in a motor vehicle.

The present invention is also particularly concerned with the attainment of the above object in a power transmission system controlled hydraulically by an assembly of cylinder, piston and adjustable sleeve all as described and shown in the specification of the prior British Patent No. 398,582.

For simplicity of description the invention will be described with reference to the accompanying drawing in which the principles underlying the present invention are embodied and illustrated but it is to be understood that the invention is not limited to these embodiments.

In the drawing, Fig. 1 is a cross section showing in elevation a group or set of rollers with their carriers and rockers as used between a pair of torus discs (as in my Patent 1,865,102, above mentioned, for example) and including hydraulic control mechanism therefor such as shown, for example, in the above mentioned British Patent No. 398,582. Figure 2 is an elevation, partly in section, of a roller with carrier and supporting rockers, and portions of the second and third such assembly, this figure showing novel forms of connection between rockers and carriers. Fig. 3 is a detail view illustrating a modification of a construction shown in Fig. 2.

Referring first to Fig. 1, 10 is one of two torus discs, the other (not shown) being between disc 10 and the observer. Three rollers 11, 12, 13 are shown, cooperating with the discs and rotatably mounted in carriers 14, 15, 16 supported by their ball ends in sockets which are formed in the arms of the rockers 17, 18, 19. The latter are pivotally mounted on a suitable support, not shown, and are equipped with arms 23, 24, 25 extending radially into cooperation with the recesses in an equalizing and control member 20a floating on the shaft 21 on which the torus discs are mounted. The equalizing and control member is connected to a control ring 20 by radial spokes one of which is shown at 20b, Fig. 3, as illustrated in my copending application Serial No. 618,054, referred to below. It will therefore be seen that if the control ring is rotated slightly the carriers will be rocked on their pivots, thereby causing precession of the rollers and consequent change of speed ratio, as explained in my prior Patent 1,865,102, above mentioned.

Actuation of the control ring 20 may be effected by any suitable and convenient means, acting, say, through the instrumentality of links 26, 27 connecting the ring with a lever 28 fulcrumed on the side of a lever 29 which is itself fulcrumed at 30, as illustrated and described in my copending application Serial No. 618,054, and in my British Patent No. 392,589. For actuation of the lever 29 on its fulcrum, it is in the present instance provided with gear connection with the shorter arm of an actuating lever 31.

This lever 31 is itself actuated by connection of its longer arm with a piston 32 in a fluid pressure cylinder 33 supplied with fluid, preferably oil, delivered through a pipe 34 by a pump (not shown) operated by the motor (not shown) which drives the transmission mechanism. The movement of the piston is controlled by a sleeve-valve 35 which can be set by a link 35a actuated from outside of the casing by any convenient means, not shown.

In order to permit free equalization of the load among the rollers as explained in my copending application Serial No. 618,054 above mentioned, and also to allow reasonable manufacturing tolerances, the distance between the ball ends of each roller carrier is made an appreciable amount shorter than the distance between the sockets of the supporting rockers, thus providing a slight amount of play or clearance within the limits of which the carriers can move axially with respect to the supporting rockers. Speed ratio control is effected by movement of the roller carriers in a direction to take up the clearance thus provided. For example, if with the engine driving the car the frictional forces on the rollers are such as to tend to revolve the roller assembly in planetary fashion counterclockwise (in the direction of the arrow, Fig. 1) the carriers are all moved in the same direction as far as the aforesaid clearance will permit. For convenience this may be said to be the "forward" direction of the forces exerted on the rollers. Thus in the case of roller 11 and carrier 14, the action described takes up all of the clearance at the left end of the carrier and leaves it all at the right end. If, now, the frictional forces on the roller are reversed (being then exerted in what may for convenience be termed the "rearward" direction), as happens, for example, when the operator lets the accelerator pedal rise and the car begins to drive the engine, the rollers and carriers will move clockwise in Fig. 1, and even though the position of the rockers is maintained by the control mechanism, this movement of the carriers is in effect the same as if the rockers themselves had initiated it and as a result a change of speed ratio to a higher value occurs. This effect is somewhat like "free wheeling", and when the throttle is again opened the engine has to speed up proportionately before taking hold.

A simple and effective way of obviating the free wheeling effect is illustrated in Fig. 2. In the construction there illustrated the fit of the ball and socket at one end of each carrier is made close, while at the other end the ball has a close fit circumferentially but is freely movable axially in the direction of the carrier axis. For convenience of manufacture and assembly the ball which has the close fit with a socket is carried by the rocker, as at 36, and the other by the roller carrier, as at 37. In the latter case the ball fits in a cylindrical bore 38 in the arm of the rocker, while ball 36 fits in a socket formed by a neck 39 on the carrier and a sleeve 40 which is slid onto the neck and pinned in place. Or the neck on the carrier may be provided with a screw 41, as on carrier 15, Fig. 2, which can be adjusted to give the desired close but smooth fit on the rocker ball, the inner end of the screw, which bears on the ball, being cupped. In both constructions all or practically all the clearance is confined to one end of the carrier, and accordingly there is no excessive movement of the carrier under the conditions above described. It will also be observed that in these two constructions the bore, as 38, into which one ball of the carrier extends, acts merely as a guide so far as axial movement of the carrier is concerned, and hence the guide or bore can, if desired, be in a stationary member which is not a part of the rocker, as in Fig. 3, for example. In this figure the guide bore 38 in which the ball 37 fits is formed in a stud 42 on a finger carried by any convenient stationary part, say the casing in which the transmission mechanism is housed.

Still another method of obviating the free-wheeling effect described is shown in Fig. 1 in connection with the hydraulic control mechanism. In that mechanism an additional sleeve 45 is provided in the inner bore of the piston 32 and this sleeve contains the port for registering with the settable sleeve valve 35. The bottom of this sleeve 45 is closed except for a small hole 46. The bottom of the sleeve forms a guide for the stem of a valve 47 in the lower end of the piston 32. Under driving load the valve 47 is kept closed by the upward force of lever 31, which in turn is acted on by the roller forces through the carrier-and-rocker system. Hence under driving conditions the oil under the sleeve 35 is at the same pressure as above it, being maintained in this equilibrium by the small vent hole 46. Under these conditions sleeve 45 is held by a spring 48 in its extreme upward position against a stop 49 fastened on the top of the piston 32. If now the driving force is released and the vehicle coasts, the frictional forces acting on the rollers tend to rock the lever 31 clockwise, which takes up the slight clearance allowed in the slot in piston 32 and allows valve 47 to open. The area of the port of valve 47 is many times that of vent 46 and hence the oil pressure below sleeve 45 is released and the sleeve moves down under the pressure of the oil in and above it, but this opens wide the port 50 in sleeve 45 (this port being normally closed by sleeve valve 35) and relieves the oil pressure on top of piston 32 with the result that the latter moves up under the action of the spring 51 and moves the control to a lower speed-ratio position, which can be made to just compensate for the clearance effect between rockers and carriers. A sleeve 32a, fitted in the lower end of piston 32, stops the downward movement of sleeve 45, the sleeve 32a being made of proper length to give the desired effect.

Piston 32 is kept from rotating by a tongue 31a on the lever 31 which tongue is a free fit in a slot cut through a ring 32b on the lower end of the piston.

It will be understood that while this invention is shown for use with a particular form of piston and sleeve it can be used with any form of progressive servomotor.

Having now particularly described and ascertained the nature of my said invention and in what manner the same is preferably to be performed, I declare that what I claim is:

1. In a variable speed power transmission mechanism of the class described, comprising torus disks and interposed friction rollers, the combination of a roller and a carrier in which the same is mounted for rotation; a pivoted rocker at one end of the carrier, connected to the carrier for pivotal movement of the carrier relative to the rocker without axial play of the carrier relative to said rocker; and means at the other end of the carrier to support the same for both axial movement and axial play relative to said means.

2. In a variable speed power-transmission mechanism, in combination, coaxial torus discs and interposed friction rollers, axially movable carriers for the rollers, rockers between the carriers to support the same for precession, and means connecting each carrier with its supporting rockers to permit axial movement of the carrier with respect to only one of its supporting rockers.

3. In a variable speed power-transmission mechanism, in combination, coaxial torus discs and interposed friction rollers, carriers for the rollers capable of axial movement by the frictional forces exerted on the rollers, rockers between the carriers, means to support the carriers in the rockers and enable each carrier to have axial movement with respect to only one of its supporting rockers, and control means associated with the rockers and operable to rock the same and thereby cause precession of the rollers.

4. In a variable speed power transmission mechanism, in combination, coaxial torus disks and interposed friction rollers, carriers for the rollers, and supporting rockers between the carriers, each carrier having ball-and-socket connection at its ends with the adjacent rockers, one said connection of each carrier to one rocker being closely fitted to prevent axial movement of the carrier relative to such rocker, the other connection providing clearance to permit axial movement of the carrier relative to the other rocker.

5. In a variable speed power transmission mechanism of the class described, comprising torus disks and interposed friction rollers, the combination of a roller and a carrier in which the same is mounted for rotation; a pivoted rocker at one end of the carrier to support the same for pivotal movement relative to the rocker; means associated with the carrier and rocker to prevent axial play of the carrier relative to said rocker; and a pivoted rocker at the other end of the carrier, connected to the carrier for both pivotal movement and axial play of the carrier relative to such rocker.

FRANK A. HAYES.